Dec. 21, 1965         H. J. SEAMAN         3,224,347
              SOIL PROCESSING MACHINE
Filed April 22, 1963                    3 Sheets-Sheet 2
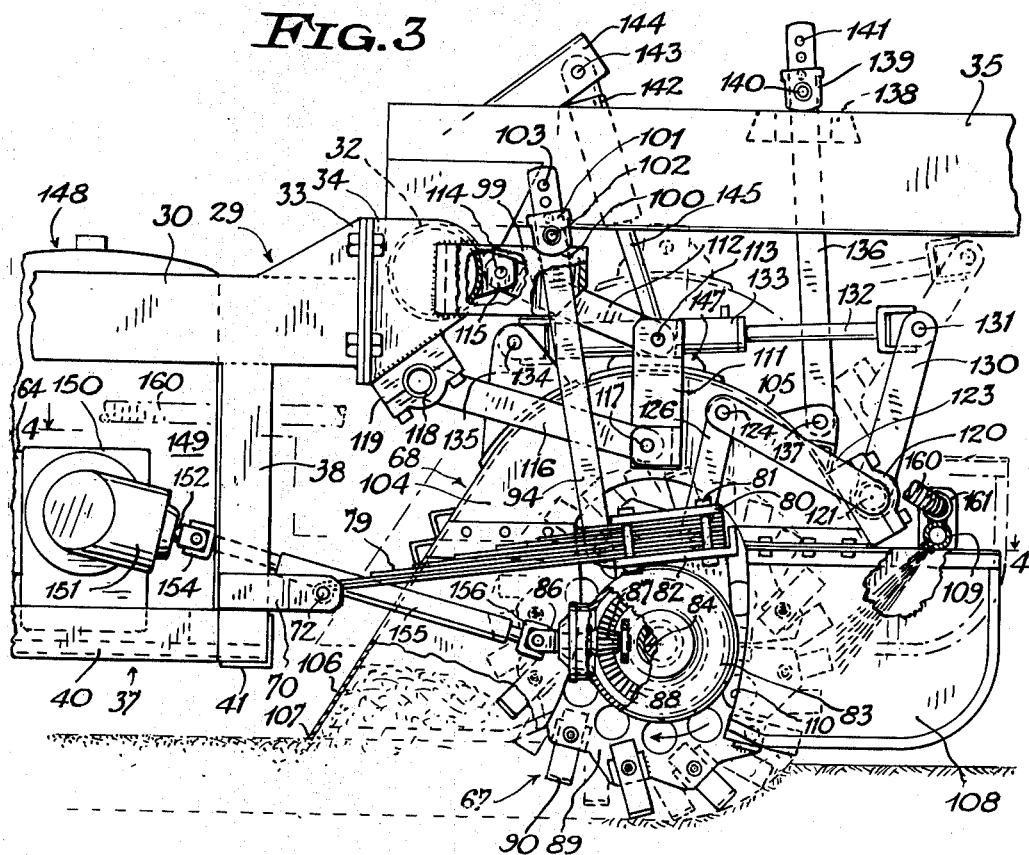
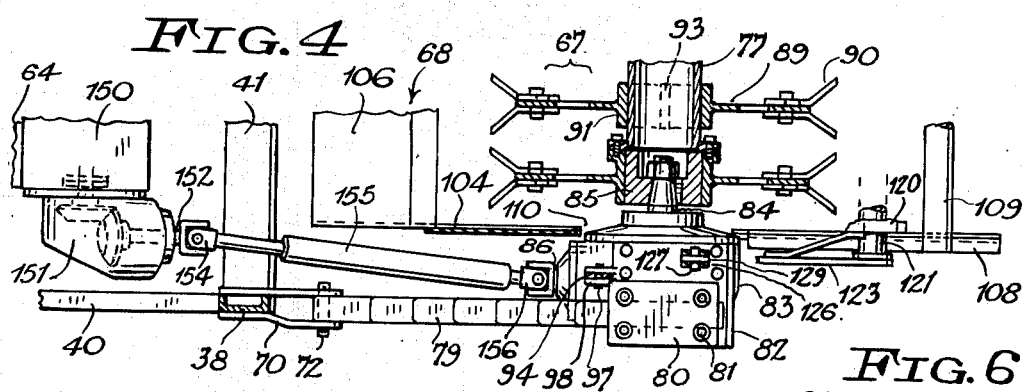
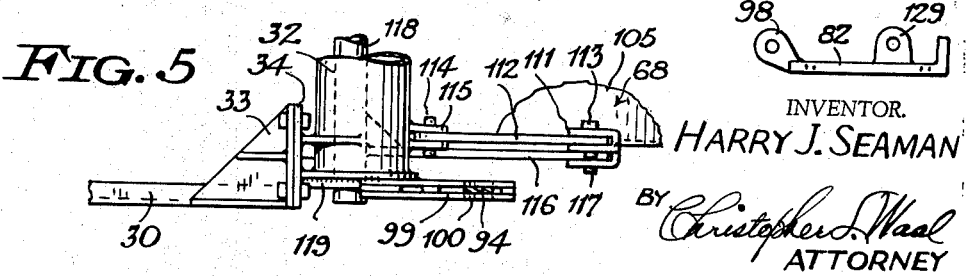
INVENTOR.
HARRY J. SEAMAN
BY Christopher S. Waal
ATTORNEY Dec. 21, 1965  H. J. SEAMAN  3,224,347
SOIL PROCESSING MACHINE
Filed April 22, 1963  3 Sheets-Sheet 3
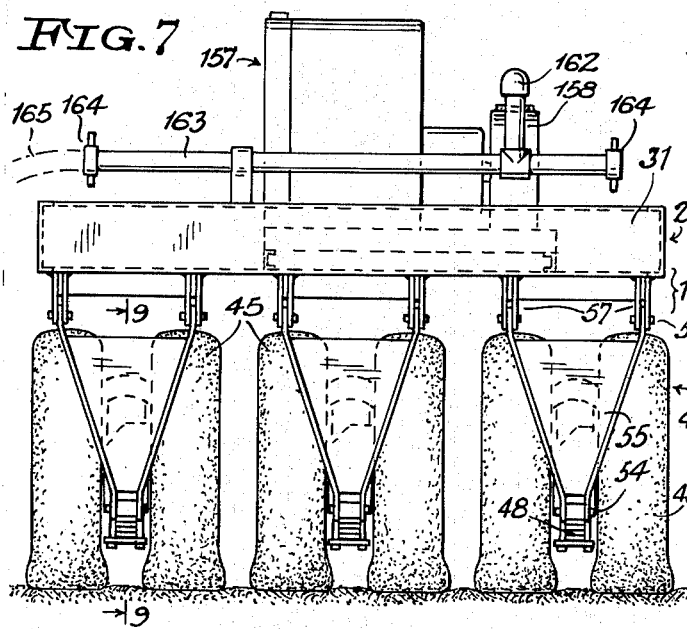
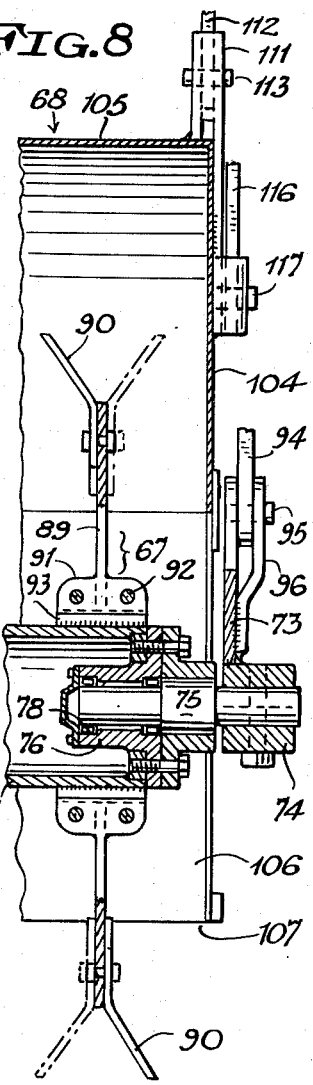
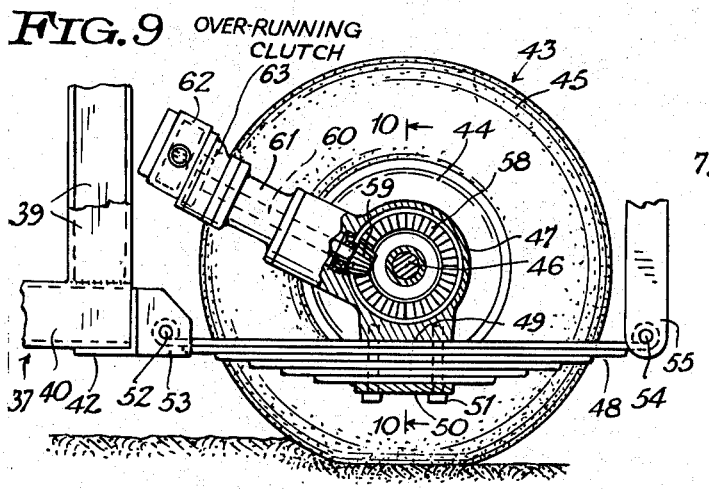
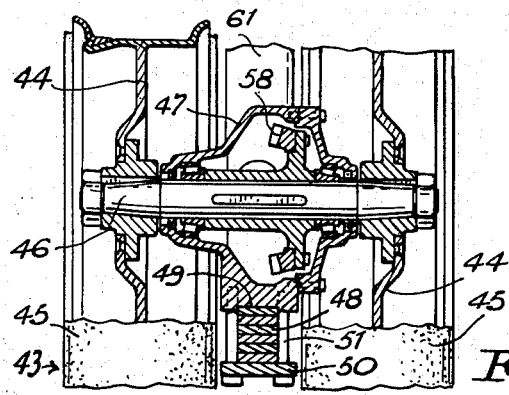
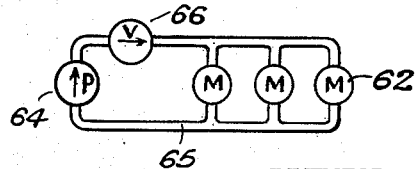
INVENTOR.
HARRY J. SEAMAN
BY Christopher L. Waal
ATTORNEY

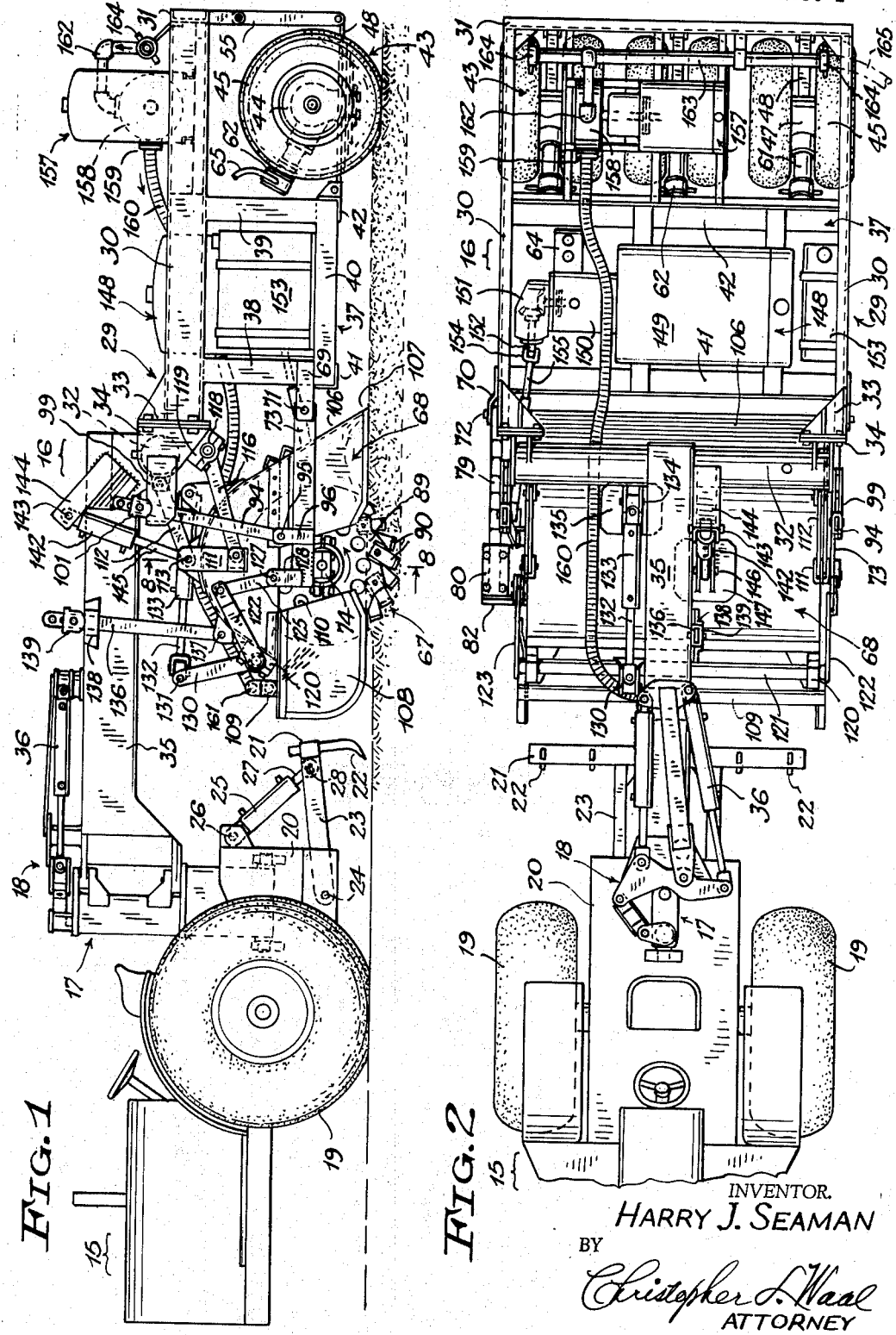

United States Patent Office 3,224,347
Patented Dec. 21, 1965

3,224,347
SOIL PROCESSING MACHINE
Harry J. Seaman, 4505 W. Roosevelt Drive,
Milwaukee, Wis.
Filed Apr. 22, 1963, Ser. No. 274,621
4 Claims. (Cl. 94—40)

This invention relates to earth working machines and more particularly to soil processing machines for use in the preparation of roadways.

An object of the invention is to provide a soil processing machine for roadway surfacing which during its travel will efficiently perform a variety of soil-working operations, such as scarifying, pulverizing, mixing, leveling, and compacting.

Another object is to provide a traveling soil processing or soil stabilizing machine including an improved power-driven rotor mixing unit for producing a homogenized even mix of soil with cement, bituminous liquid or other chemical stabilizers, the machine further effecting prompt surface sealing by compaction.

Still another object is to provide a soil processing machine having a mixing unit including a mixing rotor which will climb over stones and other obstructions and which is supported and driven in such manner as to protect the rotor, insure long wear, and reduce shock loads on the rotor driving means.

A further object is to provide a soil processing machine in which the mixing unit is disposed within the wheel base of the machine for precision in depth control, layer thickness and surface leveling.

A still further object is to provide a self-propelled earth working machine including an improved pneumatic-tired compaction roll and improved means for driving the roll-forming tires to increase the tractive action on the machine.

The invention further consists in the several features hereinafter described and claimed.

In the accompanying drawings,

FIG. 1 is a left-hand side elevational view of a soil processing machine constructed in accordance with the invention, the machine being shown in operating condition;

FIG. 2 is a top plan view of the machine;

FIG. 3 is a fragmentary right-hand side elevation of the machine, a raised position of the rotor unit of the machine being indicated in broken lines;

FIG. 4 is a sectional plan view taken generally on the line 4—4 of FIG. 3;

FIG. 5 is a fragmentary top plan view of a right-hand side portion of the machine frame and rotor hood;

FIG. 6 is a side view of a spring mounting plate;

FIG. 7 is a rear elevational view of the machine;

FIG. 8 is a fragmentary vertical sectional view of the left-hand portion of the machine, taken generally on the line 8—8 of FIG. 1;

FIG. 9 is a detail sectional view taken generally on the line 9—9 of FIG. 7, showing part of a rear compaction roll of the machine;

FIG. 10 is a detail sectional view taken generally on the line 10—10 of FIG. 9, and FIG. 11 is a diagrammatic view of an hydraulic driving system for the rear compaction roll.

Referring to the drawings, the soil processing machine shown therein is in the form of an articulated wheeled vehicle comprising a tractor unit 15 and a trailer unit 16 joined by a hitch 17 and provided with steering mechanism 18, such as of the hydraulic type.

The tractor unit 15 is of a conventional two-wheel type provided with large-diameter pneumatic-tired wheels 19 disposed at opposite sides of its frame 20. In accordance with a feature of the invention, the machine includes scarifying means here shown to be mounted on the tractor unit and to comprise a transversely extending scarifier beam 21 carrying laterally spaced scarifier teeth 22. The scarifier beam is rigidly attached to the rear ends of vertically swingable supporting arms 23, the front ends of which are pivotally secured at 24 on the rear portion of the tractor frame to turn about a transverse horizontal axis. The scarifier beam is raised and lowered by an hydraulic cylinder 25 having its upper end pivotally secured at 26 to the tractor frame and having its piston rod 27 pivotally secured at 28 to the beam.

The trailer unit 16 comprises a frame 29 including spaced parallel channel side beams 30 rigidly connected at their rear ends by a channel cross beam 31 and at their front ends by a tubular cross beam 32. The tubular beam 32 may also form a tank, as for liquid fuel. The front ends of the side beams are provided with welded flanged brackets 33 which are rigidly but detachably bolted to companion flanged brackets 34 welded to the opposite ends of the tubular cross beam 32, thus facilitating assembly. The plane of abutment of the clamped brackets 33 and 34 is vertical and is disposed at right-angles to the longitudinal axis of the trailer unit.

The trailer frame further includes a hollow horizontal gooseneck 35 rigidly welded at its rear end to the middle portion of the tubular cross beam 32 and projecting forwardly therefrom along the longitudinal center line of the trailer frame, the front end of the gooseneck being pivotally secured to the tractor hitch 17. The hydraulic steering mechanism 18 includes cylinders 36 pivotally carried on the gooseneck.

A sub-frame 37 laterally bridges the intermediate portion of the trailer frame and includes front and rear vertical members 38 and 39 projecting downwardly from the side beams 30 and connected at their lower ends by stringers 40 and front and rear cross members 41 and 42.

The rear portion of the trailer frame is supported by a ground-engaging compaction roll 43 which comprises a plurality of at least three pairs of transversely aligned laterally spaced wheels 44 with respective pneumatic tires 45. The wheels in each pair are carried on the opposite ends of a horizontal axle shaft 46, FIGS. 9 and 10, mounted in a housing 47 disposed between the spaced wheels. Each housing is rigidly secured at its lower side to the central portion of a laminated leaf spring 48 extending longitudinally of the trailer frame, the spring being seated in a channel 49 formed in the underside of the housing and clamped in position by a bottom clamping plate 50 secured to the housing by stud bolts 51. The front end of each leaf spring is detachably pivotally secured by a pin 52 to a bracket 53 fixed to the rear cross member 42 of the sub-frame 37. The rear end of each leaf spring is pivotally secured by a pin 54 to the lower end of an upwardly divergent shackle arm 55, and the upper end of the shackle arm is pivotally secured at 56 to laterally spaced ears 57 fixed to the rear cross beam 31 of the trailer frame.

In the present instance, each shaft housing 47 forms a drive housing, the associated axle shaft 46 being journalled therein and having its opposite ends keyed to the associated pair of wheels 44. The shaft 46 has keyed thereto a bevel gear 58 which meshes with a bevel pinion 59 carried on a drive shaft 60. The drive shaft extends in a narrow housing extension 61 which is disposed between the pneumatic-tired wheels 44 and is inclined forwardly and upwardly, as best seen in FIG. 9. The front end of each housing extension carries a hydraulic motor 62 which is connected to the drive shaft, preferably through a clutch 63, such as an over-running clutch. The several hydraulic motors are supplied with oil under pressure from a suitably driven hydraulic pump 64, as hereinafter described, the several wheel motors being connected to the pump through a conduit system 65 which may include a valve 66, as indicated in FIG. 11. The conduit system includes flexible portions leading to the motors, so as to permit deflection of the roll-forming wheels.

The several individually sprung wheel pairs are capable of a limited lateral tilting action under the torsional restraint of the associated leaf springs 48. The roll-forming trailer-supporting wheels 44 may revolve idly during the operation of the machine or during road transport, or they may be power-driven by the hydraulic motors 62 to increase the tractive action on the machine. The wheelbase of the machine is relatively long, being of the order of 20 feet in a typical machine.

A vertically adjustable power-driven pulverizing and mixing rotor 67, hereinafter more fully described, extends transversely of the trailer frame at a region below the gooseneck 35, the rotor being disposed between the scarifier beam 21 and the trailer sub-frame 37, and the horizontal axis of the rotor lying approximately midway of the wheel-base of the machine. A hood 68, which forms a mixing chamber therein, overlies the rotor and is adjustably supported from the trailer frame, as hereinafter described.

At opposite sides of its lower front portion, the trailer sub-frame 37 has rigidly secured thereto respective forwardly projecting brackets 69 and 70 carrying respective transversely aligned horizontal pivot pins 71 and 72. A swingable arm 73, FIGS. 1 and 8, projects forwardly from the left-hand pivot pin 71 and carries a split clamping block 74 at its front end. A stub shaft 75, FIG. 8, is secured at its outer end in the block 74, and the inner portion of the stub shaft projects into a socket member 76 bolted to an end of a tubular rotor shaft 77 for supporting the rotor shaft, the socket member being provided with anti-friction bearings 78 receiving the non-rotatable stub shaft. In some instances, this relation may be reversed, the stub shaft being rigidly secured to the rotor shaft and being journalled in the block 74. At the right-hand side of the machine, FIGS. 3 and 4, a swingable arm 79 in the form of a laminated leaf spring constituting a resilient torque arm projects forwardly from the right-hand pivot pin 72, the eyed rear end of the spring being attached to this pivot pin. The front end portion of the spring is rigidly secured by a clamping plate 80 and stud bolts 81 to a flanged mounting plate 82 which is rigidly secured to the upper side of a bevel gear housing 83, hereinafter more fully described, the latter having journalled therein a horizontal output shaft 84, FIGS. 3 and 4, a protruding end of which is rigidly secured in a cupped couling fitting 85, FIG. 4, detachably bolted to the peripherally flanged adjacent end of the tubular rotor shaft 77. The gear housing 83 has journalled therein a rearwardly extending input shaft 86 with a bevel pinion 87 meshing with a bevel gear 88 fixedly secured to the output shaft 84. In some instances, the gear housing may be of the double-reduction type. The input shaft is power-driven, as hereinafter described, for rotating the pulverizing rotor in the direction indicated, tending to exert a forward thrust on the machine.

The tubular rotor shaft 77 rigidly carries thereon a series of axially spaced two-part tine-mounting plates 89, FIGS. 4 and 8, on the peripheral portions of which are laterally clamped a series of peripherally spaced pulverizing and mixing tines 90, the tines on each plate being disposed alternately on opposite sides of the plate and having their cutting edges bent or curved in opposite directions. The successive plates are angularly spaced to provide a staggered disposition of the tines. The tine-mounting plates include split hubs 91 which are clamped to the rotor shaft by bolts 92, the shaft having keys 93 fixed thereon and engageable in the split hubs.

The cutting depth of the tines is adjustably limited by a pair of suspension link bars 94 at opposite ends of the rotor, the lower end of the left-hand bar being attached by a pivot pin 95 to a bracket 96 on the front portion of the swingable rotor-supporting arm 73, FIG. 8, and the lower end of the right-hand bar being attached by a pivot pin 97 to a pair of spaced ears 98 on the spring mounting plate 82, FIG. 4. The upper portions of the link bars slidably extend through respective vertical slot-forming guides 99 welded to the opposite ends of the tubular cross bar 32 of the trailer frame and projecting forwardly from this cross bar. The upper edges of the guides are provided with concave seats 100 receiving the rounded lower ends of stop blocks 101 slidable on the respective link bars and secured to the bars by bolts 102 passing selectively through a series of bolt openings 103 formed in the bars.

The rotor hood 68 comprises parallel vertical end walls 104 connected by a cylindrically arched top wall 105 and a sloping rear wall 106, the latter joining the rear edge of the top wall and the rear edges of the end walls. The lower edge 107 of the sloping rear wall forms a strikeoff, and the horizontal shoe-forming lower edges of the end walls are normally disposed at or near ground level. The front of the hood is open, and the vertical end walls have front extensions 108 with rounded lower front edges. A spray bar 109 extends across the open front portion of the hood and is secured to the upper portions of the front extensions of the end walls. The hood end walls have downwardly opening slots or notches 110 to clear the end portions of the rotor.

A pair of vertical bracket plates 111 are fixed to the opposite end walls of the hood above the rotor shaft and project above the hood. A pair of arms 112 have respective pivotal connections 113 at their front ends with the upper ends of the bracket plates 111, and the rear ends of these arms have pivotal connections 114 with forwardly projecting ears 115 on the tubular cross beam 32. Spaced below each arm 112 is another arm 116 extending generally parallel thereto. The front ends of the arms 116 have pivotal connections 117 with the lower ends of the hood bracket plates 111, and the rear ends of the arms 116 are rigidly secured to a horizontal tubular cross shaft 118 journalled in bearings 119 fixed to the opposite ends of the frame cross beam 32. The two pairs of generally parallel arms 112 and 116 and the hood bracket plates 111 form linkages which maintain the hood in a substantially level condition when the hood is vertically shifted.

A pair of bearings 120 are fixed to the opposite ends of the hood 68 at the front of the arched top wall of the hood and have journalled therein a horizontal tubular rock shaft 121 provided at opposite ends with upwardly and rearwardly projecting arms 122 and 123. The rear ends of the arms 122 and 123 are pivotally connected at 124 to the upper ends of respective links 125 and 126, and the lower ends of the links are respectively pivotally connected at 127 to a bracket 128 on the front portion of the left-hand rotor-supporting arm 73 and to an ear 129, FIGS. 4 and 6, on the spring mounting plate 82. An upwardly projecting arm 130 fixed to the intermediate portion of the rock-shaft 121 has a pivotal connection 131 at its upper end with the front end of a piston rod 132 of a hydraulic cylinder or ram 133, and the rear end of the cylinder 133 has a pivotal connection 134 with an eared bracket plate 135 rigidly secured to the rear portion of the hood top wall 105. By means of this linkage the rotor can be raised and lowered with respect to the hood, and the weight of the hood can be used to exert a downward pressure on the rotor when the rotor is in soil-pulverizing operation. The downward travel of the hood is adjustably limited by a link bar 136 the lower end of which has a pivotal connection 137 with the front portion of the hood top wall, and the upper portion of which slidably extends through a guide member 138 secured to a side of the trailer frame gooseneck 35. A stop block 139 is secured to the link bar 136 by a bolt 140 and is adapted to rest on the top of the guide member, the link bar having a series of bolt holes 141 for selectively receiving the bolt. The hood is raised by a hydraulic cylinder 142 the upper end of which has a pivotal connection 143 with a bracket 144 fixed as by welding to a side of the trailer frame gooseneck. The cylinder has a downwardly projecting piston rod 145 the lower end of which has a pivotal connection 146 with an eared bracket plate 147, FIGS. 2 and 3, fixed to the central portion of the arched top wall of the hood.

The trailer sub-frame 37 mounts a rotor-driving power unit 148 which includes an internal combustion engine 149 extending transversely of the machine, the power unit also including at its right-hand end a change-speed transmission 150 and a bevel gear drive housing 151 with a forwardly projecting output shaft 152. The sub-frame also supports a fuel tank 153 for the engine. A universal joint 154 on the output shaft 152 is connected to the rear end of a telescopic shaft 155, and the front end of this shaft is connected by a universal joint 156 to the rear end of the input shaft 86 of the spring-mounted rotor-driving gear housing 83. By this gearing connection the tine-carrying rotor shaft is rotated in a direction tending to propel the vehicle. Shocks imparted to the rotor, as by striking rocks or other obstructions, are absorbed by the spring-mounted gear housing 83, which is free to shift or turn, incident to the gearing reaction through a limited angle about the rotor axis under the restraint of the torque arm-forming leaf spring 79. The leaf spring also reduces shock loads on the driving mechanism. In addition, the arm-supported rotor is free to yield upwardly so as to climb over rocks or other obstructions.

The hydraulic pump 64 for operating the hydraulic wheel motors 62 is driven by any suitable source of power. By way of example, the pump is here shown to be driven by the power unit 148, as seen in FIG. 2. In some instances, the pump may be driven by the tractor engine.

The trailer frame 29 has mounted at its rear portion an internal combustion engine unit 157 which drives a rotary pump 158 of either the positive displacement or centrifugal type. The pump discharge 159 is connected by a flexible hose 160 with a fitting 161 attached to the spray bar 109 on the rotor hood. The pump intake 162 is connected to a horizontal cross pipe 163 which is mounted on the trailer frame behind the pump and has selectively usable inlets at opposite ends closed by detachable screw caps 164. Either end of the cross pipe is adapted for connection with the discharge hose 165 of a tank truck, not shown, which travels along with the machine, and which supplies either water or bituminous liquid to the pump.

In use, the machine is propelled at a suitable low rate of speed along a ground area to be processed, the rotor hood 68 being lowered to or near the ground surface under the control of the hydraulic cylinder 142 and the stop links 136, and the power-driven pulverizing rotor 67 being lowered with respect to the hood under the control of the hydraulic cylinder 133 and the stop links 94 to provide the desired depth of soil penetration. In the case of hard soil, the scarifier beam 21 on the tractor is lowered to effect a preliminary breaking up of the soil. The pulverizing rotor 67 is rotated by the power unit 148 at a suitable rate of speed to effect a thorough pulverization of the soil. At the same time, water, bituminous material, or chemical solutions, according to the type of road bed being prepared, is sprayed under pressure onto the soil from the spray bar 109 and is thoroughly mixed with the pulverized soil. In the case of a soil-cement road, a layer of cement is deposited on the ground in advance of the machine. The rotor hood 68 is held down under adjustable pressure by the hydraulic cylinder 142, and the hood weight can be imposed on the rotor by applying hydraulic pressure to the cylinder 133 in a direction to urge the armed rock shaft 121 clockwise as viewed in FIG. 1, downward pressure being thus applied to the rotor-supporting arms 73 and 79 by the link bars 125 and 126. By adjusting the angle through which the rock shaft 121 is hydraulically shifted, the hood can be adjustably raised, thus adjusting the elevation of the rear strike-off edge 107 of the hood to control the amount of pulverized material spilled under this edge. As the machine travels, the pulverized and mixed road bed material is compacted and kneaded by the rubber-tired compacting roll 43 at the rear of the machine, the roll also providing a sealing action on the road bed. Since the rotor is located about midway of the relatively long wheelbase of machine, the road bed will be comparatively level. In normal operation, the roll-forming wheels rotate idly, but when required these wheels can be power-driven by the hydraulic motors 62.

For road transport of the machine, the rotor is stopped and is raised into the hood by the hydraulic cylinder 133, and the hood is raised well above ground level by the hydraulic cylinder 142. During this manipulation, the stop links 94 and 136 slide upwardly in their respective guides 99 and 138. The machine is then capable of traveling at fair road speed on its pneumatic tires.

It will be understood that the modifications may be made without departing from the spirit of the invention. By way of example, the side beams of the trailer frame may be lengthened and the gooseneck correspondingly shortened, without materially changing the wheelbase, so as to permit disposition of the medially located mixing rotor under the side beams. In such case, the supporting and controlling means for the rotor and rotor hood can be suitably varied.

I claim:

1. In a machine for road building, a wheeled vehicle adapted to travel over a ground surface and having a frame, a hood extending transversely of said frame, linkage means connecting said hood to said frame and constraining said hood to move in a generally vertical direction, hood-supporting means carried by said frame for adjustably elevating said hood and including a first hydraulic cylinder, a soil-pulverizing rotor extending transversely of said frame in a generally horizontal position and disposed within said hood, means located between the frame and the rotor for driving said rotor, and rotor-supporting linkage means carried by said hood for adjustably elevating said rotor with respect to said hood, said last-named means including a second hydraulic cylinder carried by said hood exerting downward pressure on said rotor with respect to said hood when said rotor is in soil-penetrating position.

2. In a machine for road building, a frame movable over a ground surface, a rotor rotatable on a generally horizontal axis transverse to said frame and provided with mixing projections, arms swingably carried by said frame about an axis parallel to the rotor axis and supporting opposite ends of said rotor, power means driving said rotor and including a gear housing adjacent an end of said rotor, said gear housing having therein drive gearing including an output shaft journalled in said housing and coaxially coupled to said rotor, said housing being angularly displaceable about the common axis of said output shaft and rotor, one of said arms being a resilient deflectable torque arm rigidly secured at its outer end to said gear housing to yieldably limit angular displacement of said housing to permit limited angular displacement of said housing about the axis of said rotor for thereby absorbing shocks imparted to said rotor during the rotation of said rotor.

3. In a machine for road building, a frame movable over a ground surface, a rotor rotatable on a generally horizontal axis transverse to said frame and provided with soil-penetrating mixing projections, means for yieldably supporting said rotor from said frame, power means driving said rotor including a gear housing adjacent an end of said rotor and having therein drive gearing including an output shaft journalled in said housing and coaxially coupled to said rotor, said housing being angularly displaceable about the common axis of said output shaft and said rotor, said frame means including a power unit carried by said frame and a driving connection between said power unit and said gear housing, and resilient restraining means operatively connecting said frame and said housing to limit the angular displacement of said housing about the rotor axis for thereby absorbing shocks imparted to said rotor during the rotation of said rotor.

4. In a machine for road building, a vehicle movable over a ground surface and including a frame comprising spaced side members and a connecting cross beam and a forwardly projecting medial gooseneck secured to said cross beam, a material-mixing rotor having its axis extending transversely of said frame at an elevation lower than that of said gooseneck, a pair of laterally spaced rotor-supporting arms projecting forwardly from pivotal connections with said frame and having forward portions carrying opposite ends of said rotor, one of said arms being a resilient torque arm, a gear housing rigidly secured to the forward portion of said torque arm and having therein drive gearing including an output shaft journalled in said housing and coaxially coupled to said rotor, said housing being displaceable about the common axis of said output shaft and rotor through a limited angle under the yielding restraint of said resilient torque arm to absorb shock on said rotor, power means for driving said rotor through said drive gearing and including a power unit carried by said frame and a driving connection between said power unit and said gear housing gearing, a vertically displaceable hood overlying said rotor and movably supported by said frame, and fluid pressure actuated linkage means carried by said vehicle for supporting and raising said rotor.

References Cited by the Examiner
UNITED STATES PATENTS

| | | | |
|---|---|---|---|
| 1,632,969 | 6/1927 | Horner et al. | 94—39.5 |
| 1,889,016 | 11/1932 | Dinsmore | 94—39.51 |
| 1,930,507 | 10/1933 | Casperson | 94—39.51 |
| 2,138,904 | 12/1938 | Carswell | 94—44 |
| 2,181,320 | 11/1939 | Flynn | 94—39.51 |
| 2,214,702 | 9/1940 | Seaman | 172—77 |
| 2,368,331 | 1/1945 | Seaman | 94—40 |
| 2,394,017 | 2/1946 | Seaman | 94—39.51 |
| 2,397,782 | 4/1946 | Flynn | 94—40 |
| 2,424,459 | 7/1947 | Hettelsater | 94—40 |
| 2,616,348 | 11/1952 | Ariens | 172—112 |
| 2,657,620 | 11/1953 | Meeks | 172—112 |
| 2,833,362 | 5/1958 | Martin | 180—66 |
| 2,916,098 | 12/1959 | Millar | 180—66 |
| 2,978,967 | 4/1961 | MacDonald | 94—50 |

FOREIGN PATENTS 151,041   4/1953   Australia.

CHARLES E. O'CONNELL, *Primary Examiner.*

JACOB L. NACKENOFF, *Examiner.*